Jan. 8, 1963   F. G. THANNHAUSER   3,072,015
PROJECTION MEANS

Filed March 18, 1959   2 Sheets-Sheet 1

INVENTOR.
Fred G. Thannhauser
BY Jerry K. Harness
ATTORNEY.

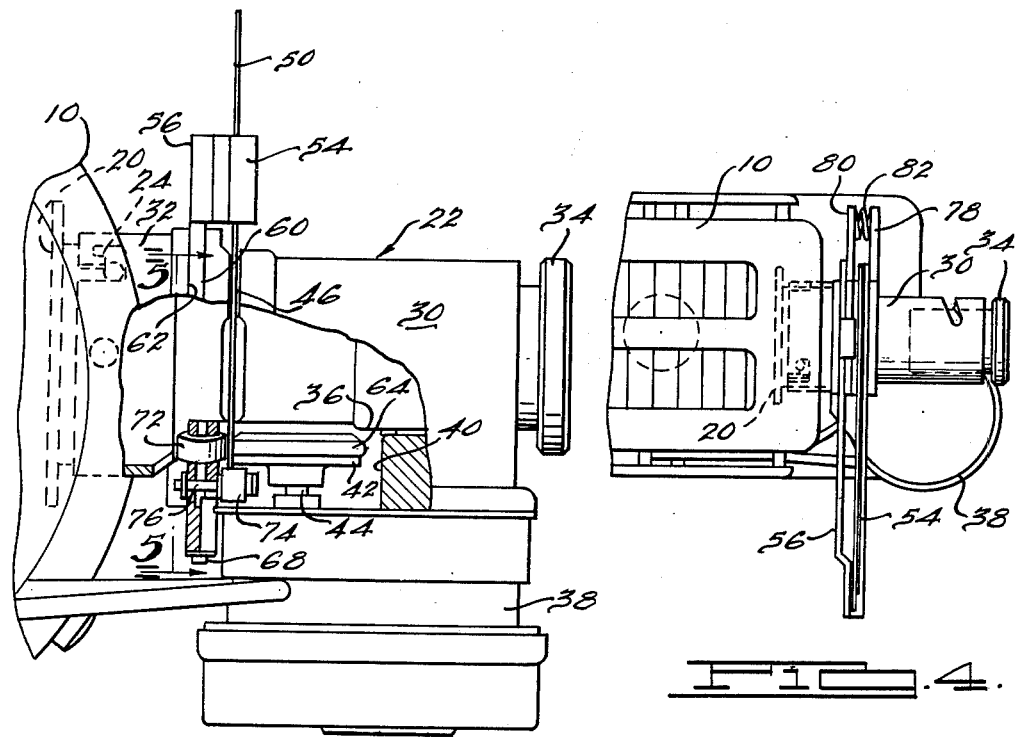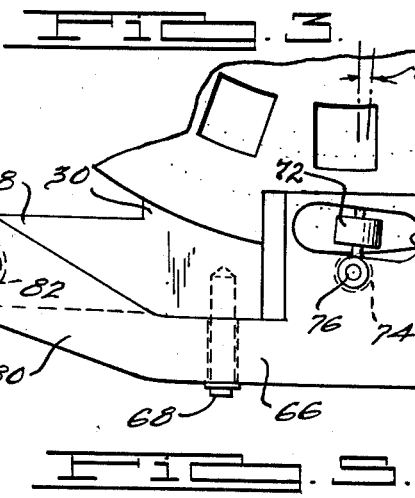

United States Patent Office 3,072,015
Patented Jan. 8, 1963

3,072,015
PROJECTION MEANS
Fred G. Thannhauser, P.O. Box 211, Boca Raton, Fla.
Filed Mar. 18, 1959, Ser. No. 800,155
1 Claim. (Cl. 88—27)

My invention relates to projection apparatus and is similar to my invention disclosed in Patent No. 2,869,420 dated January 20, 1959. The present invention, however, deals with a different phase of entertainment and has particular reference to a new and improved device for projecting moving photographic transparencies.

In the past projectors have been offered for either "motion pictures" or "slides." For the former, a motion picture camera as well as expense and skill are required. For the latter a great deal of storage area as well as physical labor are involved in the use of "slides."

A principal object of my invention is to provide an improved device incorporating a new and novel type of projection device which combines features not found in the types previously mentioned.

Another object of my invention is to provide an improved device which is economical and particularly characterized by its ease of operation.

More particularly, my invention deals with a new and novel form of projection means which supplies "moving" pictures as compared to "motion" pictures. The device employs in part a mechanism similar to a slide projector with additional novel means for progressively projecting a group of "still" pictures on a screen or the like as each picture slowly passes before the lens of the device. In accordance with one particular phase of the invention, a roll of film is mounted on a circular disc instead of individual slides and thereafter inserted into my improved projector. By this construction each picture on the disc is progressively moved before the viewer. It will be seen that by mounting and projecting a roll of film in this improved fashion that a great deal of storage space would be saved as compared to the conventional type of slides. It will also be seen that the ease of handling is greatly enhanced since only one relatively large disc need be handled as compared to a large number of relatively small individual slides.

An interesting feature of my invention includes the use of moving pictures as compared to the conventionally individually projected slides. It has been found that audience interest is generally greatly increased where the still picture is moving slowly across the screen and a new one is constantly coming into view. Suitable means may be provided for stopping movement when it is desired to concentrate on any one particular picture.

It should also be noted that my improved device may also be used, for example, in advertising where a preselected group of pictures are slowly moved through the projector in an interesting fashion.

Other objects and advantages will become apparent from the following description taken in conjunction with the enclosed drawings, in which:

FIGURE 3 is an enlarged elevational view, partly in section, of the right hand portion of the device shown in FIGURE 1;

FIGURE 4 is a partial top view of the device shown in FIGURE 1 having a portion of the disc holding means broken away to more clearly show the structure disposed thereunder; and FIGURE 5 is a view taken generally in the direction of the arrows 5—5 in FIGURE 3 to clearly show the disc release and holding lever.

Figure 1:
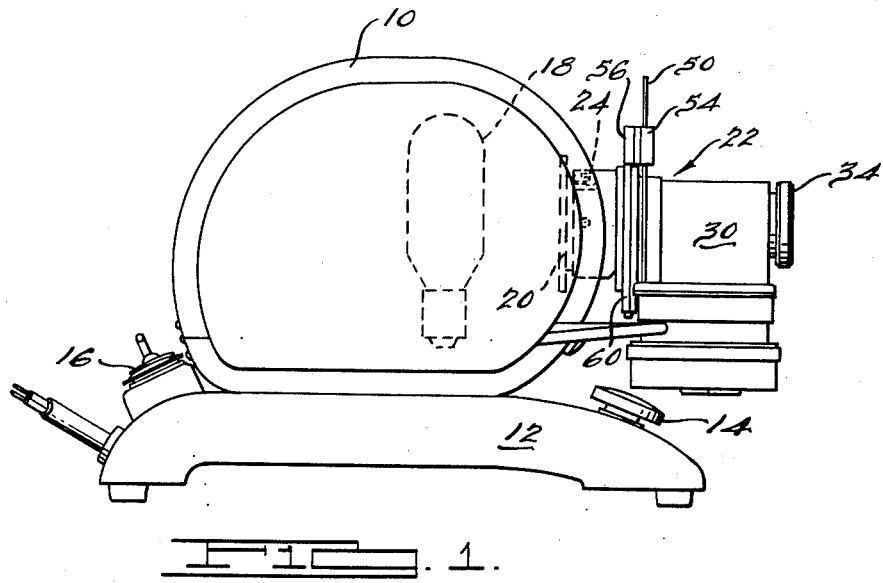
FIGURE 1 is a side elevational view of my improved device.

Referring now to the drawings and particularly to FIGURE 1, my improved device is shown which comprises an enclosure 10 disposed on a base 12. The enclosure and base are of conventional construction and carry conventional apparatus as, for example, a leveling adjustor 14, an off-on switch 16, and a light source 18. The forward end of the enclosure 10 is provided with a fitting 20 which receives and mounts the mechanism generally indicated by the numeral 22 by means of a bayonet joint construction as shown at 24. The fitting 20 is generally cylindrical in shape and may contain a light condensing system (not shown), if desired.

Figure 2:
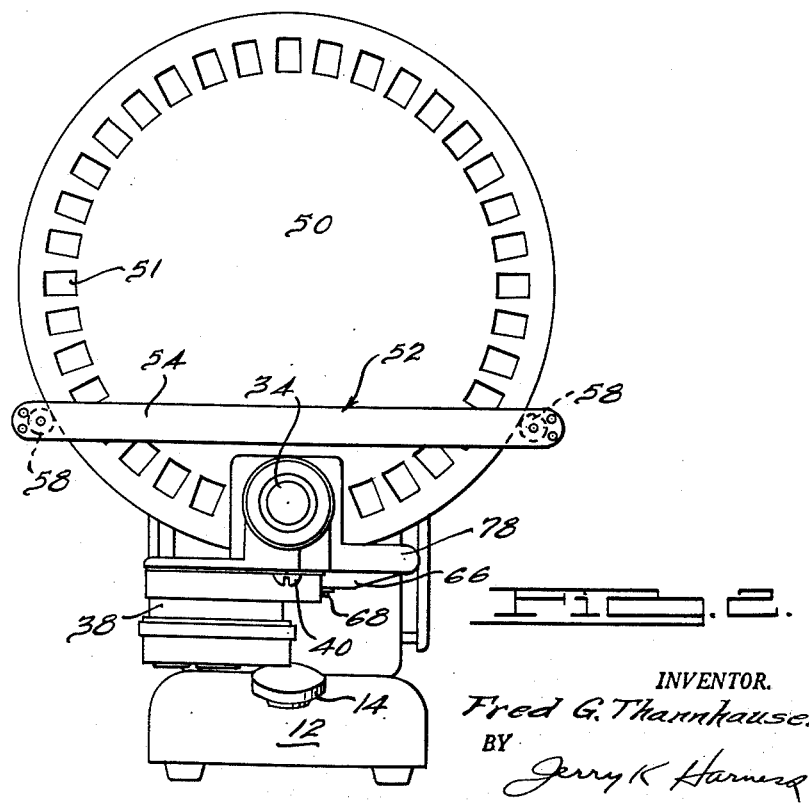
FIGURE 2 is a front view of the device.

Referring now more particularly to FIGURE 3, the mechanism 22 includes a housing 30 which has its rear portion 32 cylindrically formed to nest with the fitting 20 as heretofore set forth. Aligned with the rear portion 32 and with an adjustably positioned lens 34, the housing is provided with a substantially cylindrical passage 36 which accommodates the passage of light from the source 18 through the housing to the lens 34. Depending from one side of the housing 30 is a motor 38, the casing of which is secured to the housing by screws, one of which is shown at 40 (FIGURE 2). Interposed between the passage 36 and the motor 38 and extending inwardly into the housing 30 is a recess 40 which accommodates the positioning of a driven pulley 42. The pulley 42 is rotatable in a horizontal plane and is drivingly connected to the motor 38 by a short shaft 44. The pulley 42 rotates at a relatively slow speed as hereinafter set forth.

The housing 30 is provided with a slot 46 which extends downwardly into the recess 40. The slot 46 receives the lower portion of a disc 50, the latter containing the pictorial information to be projected from the device. As seen more clearly in FIGURES 2 and 3 the disc 50 is circular and flat and contains, preferably, a plurality of circumferentially mounted photographic transparencies 51. The disc 50 is preferably made of plastic, cardboard, or some other inexpensive type of material. To hold the disc 50 in its applied position as shown in the drawing, the device is provided with a disc holder generally indicated by the numeral 52. The holder 52 includes a front transverse member 54 and a rear transverse member 56. The members 54 and 56 are connected at their ends and adjacent each connection the holder 52 is provided with rollers 58. The rollers 58 support the disc 50 and rotate therewith when the lower portion of disc is driven by the motor as hereinafter set forth. To mount the holder 52 relative to the housing 22 the rear transverse member 56 is provided with integral depending legs, one of which is shown at 60 (FIGS. 1 and 3). These legs slide into vertical parallel grooves formed in opposite sides of the housing 22. One of the grooves is indicated at 62 in FIGURE 3. When the holder 52 is placed into position, the lower center portion of the rear transverse member 56 of the holder bottoms up against the top of the housing. The holder 52 is formed in the aforementioned manner to facilitate easy removal of the holder when it becomes necessary to store the device. The dimensions of the holder are predetermined relative to the size of the disc 50 so that the lower edge of the disc extends into the slot 46 and recess 40 a predetermined distance to the roller 74.

The driven pulley 42 is provided with a friction ring 64 and in accordance with my invention, the ring 64 is adapted to engage one side of the lower edge of the disc 50. To accommodate a friction drive between the pulley 42 and the disc 50, I have provided a pressure holding means in the form of a lever 66. The lever 66 is pivotally mounted by a pin 68 on the housing 30. One end of the lever 66 is enlarged and is provided with a cut out portion 70 which accommodates the mounting of a pressure roller 72. Directly below the roller 72 and disposed perpendicular to said lever is an idler roller 74. The roller 74 is rotatably mounted by pin 76 and forms the seat for the lower edge of the disc 50. The housing 30 is provided with an integral extension 78 which cooperates with the opposite end 80 of the lever 66. A coil spring 82 is interposed between the end 80 and the extension 78 and urges the lever 66 through its pivotal connection to the housing into the position in the drawings where the roller 72 engages the lower edge of the disc 50 on the opposite side from the ring 64 on the driven pulley 42. By this construction the lower edge of the disc 50 is maintained in frictional engagement with the ring 64 on the driven pulley 42 thereby accommodating rotation of the disc 50 in response to rotation of the driven pulley. The driven pulley 42 rotates at a relatively slow speed compared with the speed of the motor. Suitable speed reducing means (not shown) are interposed between the motor and the shaft 44. It has been found that an acceptable speed of the driven pulley 42 is reached when it takes approximately 5 to 10 seconds for one transparency to cross a viewing screen.

As seen in FIGURE 5, the axis of the pressure roller 72 is displaced by a small acute angle as shown at 84 from a line drawn from the point of contact of the roller 72 and disc 50 through the center of the disc. By this construction and in view of the direction of rotation of the disc 50 as shown at 90, the pressure roller 72 applies a small moment of force during rotation to maintain the disc 50 within the slot 46 thereby preventing the disc from "riding out" of the device. To remove or insert the disc 50 the operator need only apply pressure to the lever 66 at the location of the spring 82 to pivot the pressure roller 72 out of engagement with the disc. It should be noted that the rollers 58 and the roller 74 form a three point support for the disc 50. It should also be noted that the width of the roller 74 is predetermined so that the lower edge of the disc 50 will engage the cylindrical surface thereof even though the pressure roller 72 is pivoted out of position to allow insertion of the disc.

Operation of the device is very simple. The holder 52 is slipped into the vertical grooves in the housing. The lever 66 is pivoted out of the way and the disc 50 is pressed down until it engages the rollers 58 and 74. The lever 66 is then released and the unit is turned on. The transparencies are then projected onto any suitable viewing screen.

Although not shown for the purpose of clarity, it will be appreciated that a suitable switch may be incorporated in the device for turning off the motor while the light source is still projecting the picture. Such a switch may be incorporated in the switch 16 or, by way of example, may be attached on or adjacent the motor 38. Similarly an extension cord could be added so that the operator could set back in a comfortable chair with a switch in his hand so he could stop the movement of the disc when he so desired.

While I have shown and described one embodiment of my invention such is for the purpose of illustration only and those skilled in the art may vary the structure without departing from the spirit of the invention or the scope of the claim appended hereto.

I claim:

In combination, a housing, light means in said housing, projection means carried by said housing and comprising a lens, a disc carrying a plurality of photographic transparencies generally around its peripheral edge, means carried by said housing and positioning said disc relative to said light means and said lens and consisting of roller means engaging outer peripheral edge portions of said disc, a motor carried by said housing and having a driven roller frictionally engaging the outer peripheral edge of one side of said disc, and a disc release and holding means including a spring pressed lever pivotally carried on said housing and carrying a pressure roller, said pressure roller being juxtaposed said driven roller and engageable with the opposite side of said disc to provide driving frictional engagement of said disc and driven roller, the axis of said pressure roller being disposed at an acute angle with a line extending from the point of contact of said pressure roller and disc to the center of said disc whereby said pressure roller during rotation thereof exerts a moment of force on said disc opposing movement of said disc out of said housing.

References Cited in the file of this patent
UNITED STATES PATENTS

| | | |
|---|---|---|
| 624,397 | Stanton | May 2, 1899 |
| 1,965,688 | Chase | July 10, 1934 |
| 2,869,420 | Thannhauser | Jan. 20, 1959 |

FOREIGN PATENTS

| | | |
|---|---|---|
| 6,431 | Great Britain | of 1886 |